United States Patent
Liu et al.

(10) Patent No.: US 10,596,610 B2
(45) Date of Patent: Mar. 24, 2020

(54) STRADDLE-TYPE STEEL SECTION PROCESSING DEVICE OF MULTIPLE SADDLES

(71) Applicant: COSEN MECHATRONICS CO., LTD., Hsinchu (TW)

(72) Inventors: Ting-Fang Liu, Taichung (TW); Mu-Shui Huang, Hsinchu (TW); Chung-Te Tang, Hsinchu (TW); Chin-Piao Lin, Hsinchu (TW)

(73) Assignee: COSEN MECHATRONICS CO., LTD., Hsinchu (TW)

( * ) Notice: Subject to any disclaimer, the term of this patent is extended or adjusted under 35 U.S.C. 154(b) by 509 days.

(21) Appl. No.: 15/453,373

(22) Filed: Mar. 8, 2017

(65) Prior Publication Data
US 2017/0259315 A1    Sep. 14, 2017

(30) Foreign Application Priority Data

Mar. 11, 2016  (TW) .............................. 105203344 A

(51) Int. Cl.
| | | |
|---|---|---|
| *B21C 51/00* | (2006.01) | |
| *B23Q 1/01* | (2006.01) | |
| *B23Q 39/02* | (2006.01) | |
| *B23Q 1/62* | (2006.01) | |
| *B21D 47/01* | (2006.01) | |

(52) U.S. Cl.
CPC .............. *B21C 51/00* (2013.01); *B21D 47/01* (2013.01); *B23Q 1/017* (2013.01); *B23Q 1/626* (2013.01); *B23Q 39/026* (2013.01)

(58) Field of Classification Search
CPC ........ B21D 47/01; B21C 51/00; B23Q 1/017; B23Q 1/626; B23Q 1/56; B23Q 39/026
See application file for complete search history.

(56) References Cited

U.S. PATENT DOCUMENTS 5,127,621 A  *  7/1992  Uecker ................. B60N 2/143
                                                   248/416
6,640,677 B2 * 11/2003  Ueda ..................... B23Q 1/017
                                                    29/27 C (Continued)

FOREIGN PATENT DOCUMENTS

JP        03251301 A  *  11/1991  ........... B23Q 39/026

OTHER PUBLICATIONS

Machine translation of JP 03-251301A, Sekiya, pp. 1-10, translated on Sep. 10, 2019 (Year: 2019).*

*Primary Examiner* — Teresa M Ekiert
(74) *Attorney, Agent, or Firm* — WPAT, PC

(57) ABSTRACT

A straddle-type steel section processing device of multiple saddles is disclosed, which comprises: a machine unit, a holding unit, a Z-axis direction processing unit, a pair of Y-axis direction processing units, a Y-axis direction guiderail unit and a Y-axis direction driving unit. In an embodiment, the Y-axis direction processing units are arranged respectively at the two sides of the Z-axis direction processing unit while allowing each to slide in a Y-axis direction as each Y-axis direction processing unit is further being mounted on a crossbeam of a base fitted on the machine unit. By sildably mounting the side saddles of the Y-axis direction processing unit on an end surface of the crossbeam, not only a desire condition of stable positioning can be achieved, but also the processing accuracy is enhanced.

20 Claims, 8 Drawing Sheets

(56) References Cited

U.S. PATENT DOCUMENTS

| | | | | |
|---|---|---|---|---|
| 7,997,172 B2 * | 8/2011 | Hyatt | ............... | B23Q 39/026 29/27 C |
| 9,211,621 B2 * | 12/2015 | Hessbrueggen | ..... | B23Q 39/026 |
| 10,112,274 B2 * | 10/2018 | Hoshi | ............... | B23Q 1/017 |

* cited by examiner

STRADDLE-TYPE STEEL SECTION PROCESSING DEVICE OF MULTIPLE SADDLES

CROSS REFERENCE TO RELATED APPLICATION

This application also claims priority to Taiwan Patent Application No. 105203344 filed in the Taiwan Patent Office on Mar. 11, 2016, the entire content of which is incorporated herein by reference.

FIELD OF THE INVENTION

The present invention relates to a steel section processing machine, and more particularly, to a straddle-type steel section processing device of multiple saddles.

BACKGROUND OF THE INVENTION

Generally, steel sections of various shapes, including H-beam steels, I-beam steels, channel beams, angle steels, steel plates and steel square tubes, are subjected to be drilled, milled and/or tapped in three different axial directions just for fitting the same to be fixed or to be ready for accessory installation.

In Japanese Unexamined Patent Application Publication No. Hei 11-165210, a steel section processing machine is disclosed, which comprises: a machine; a first door-type stand, mounted on the machine; a Z-axis direction processing unit, mounted on the first door-type stand; a second door-type stand, mounted on the machine at a side of the first door-type stand; a pair of Y-axis direction processing units, mounted on the second door-type stand. In addition, there are a pair of guide rails arranged respectively at the two sides of the second door-type stand that are extending in the Z-axis direction for enabling the two Y-axis direction processing units to move up and down respectively on the corresponding guide rails in the Z-axis direction.

Nevertheless, despite the aforesaid processing machine is quite capable of achieving a desirable and predictable machining effect, such processing machine is disadvantageous by the heavy weight of its Y-axis direction processing units. That is, as the guiderails are connected to a front side of the second door-type stand and the pair of the Y-axis direction processing units are mounted respectively on the guide rails, the positioning of the Y-axis direction processing units in correspondence to the second door-type stand can easily be displaced after a period of time for causing offset errors to the operating Y-axis direction processing units, and therefore, certain calibration procedure must be performed regularly so as to ensure a satisfactory processing accuracy to be achieved.

SUMMARY OF THE INVENTION

In view of the disadvantages of prior art, the primary object of the present invention is to provide a straddle-type steel section processing device of multiple saddles, that not only can achieve a desire condition of stable positioning, but also-can enhance processing accuracy.

In an embodiment of the invention, a straddle-type steel section processing device of multiple saddles is disclosed, which comprises: a machine unit, a holding unit, a Z-axis direction processing unit, a pair of Y-axis direction processing units, a Y-axis direction guiderail unit and a Y-axis direction driving unit. In an embodiment, the machine unit further comprises: a base; a pair of columns that are fixedly mounted on the base; and a crossbeam that is disposed on the tops of the column pair; in which the base is composed of: a first end, a second end that is disposed opposite to the first end in an X-axis direction, and a top surface that is arranged extending from the first end to the second end; the two columns are disposed a distance from each other in a Y-axis direction that is perpendicular to the X-axis direction while each being arranged extending in a Z-axis direction that is perpendicular to the X-axis direction and the Y-axis direction simultaneously; and the crossbeam that is arranged extending in the Y-axis direction is formed with an end surface that is arranged parallel to the top surface. Moreover, the holding unit is mounted on the top surface of the machine unit, and the Z-axis direction processing unit that is mounted on the crossbeam for allowing the same to slide in the Y-axis direction has a Z-axis processing head that is disposed facing toward the top surface. In addition, the Y-axis direction processing units are arranged respectively at the two sides of the Z-axis direction processing unit while allowing each to slide in a Y-axis direction as each Y-axis direction processing unit is further being mounted on the crossbeam; and further each Y-axis direction processing unit is composed of: a side saddle that is mounted on the end surface of the crossbeam for allowing the same to slide in the Y-axis direction, a side positioning seat that is mounted on the side saddle for allowing the same to slide in the X-axis direction, a first side driving member that is disposed at a position between the side saddle and the side positioning seat for allowing the same to drive the side positioning seat to slide relative to the side saddle in the X-axis direction, a side sliding seat that is mounted on the side positioning seat for allowing the same to slide in the Z-axis direction, a second side driving member that is disposed at a position between the side positioning seat and the side sliding seat for allowing the same to drive the side sliding seat to slide relative to the side positioning seat in the Z-axis direction, and a Y-axis processing head that is mounted on the side sliding seat. Furthermore, the Y-axis direction guiderail unit is arranged extending in the Y-axis direction and is disposed at a position between the end surface of the crossbeam and the Y-axis direction processing units, and the Y-axis direction driving unit is disposed at a position between the crossbeam, the Z-axis direction processing unit and the two Y-axis direction processing units, by that the Y-axis direction driving unit is able to drive the Z-axis direction processing unit and the pair of Y-axis direction processing units to slide respectively in the Y-axis direction.

Operationally, by sildably mounting the side saddles of the Y-axis direction processing units on the end surface of the crossbeam, not only a desire condition of stable positioning can be achieved without requiring constant and regular calibration, but also the processing accuracy is enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
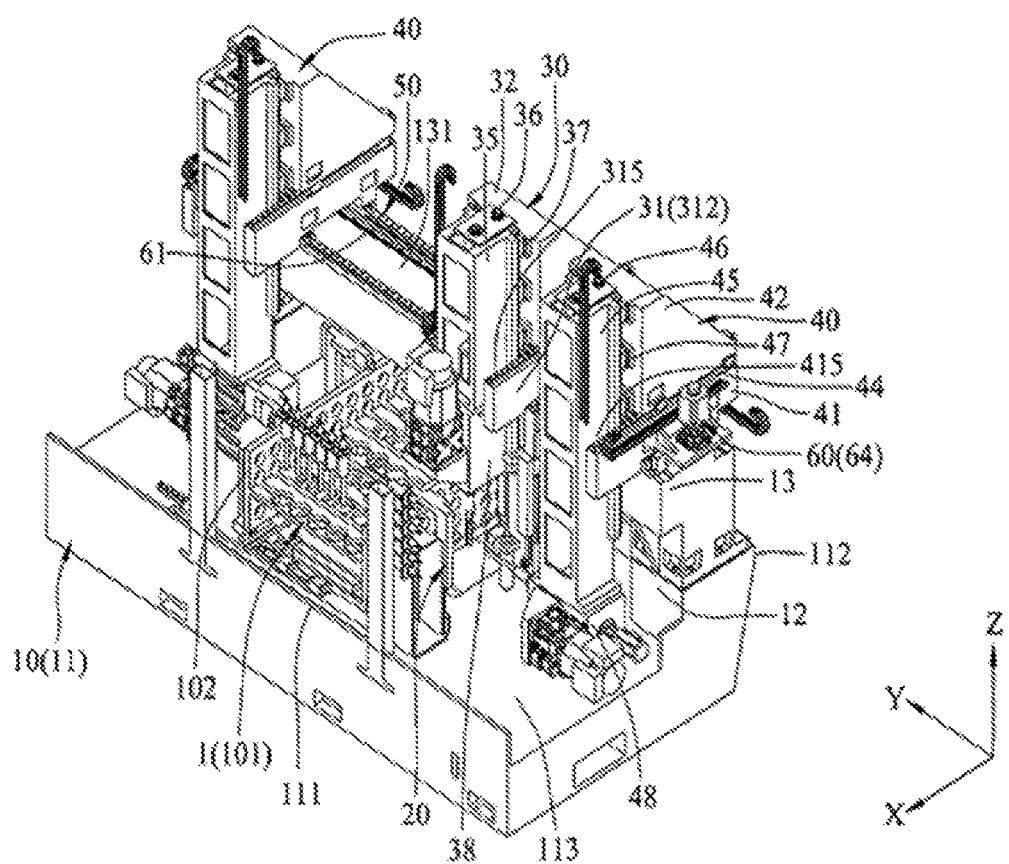
FIG. 1 is a three-dimensional view of a straddle-type steel section processing device of multiple saddles according to an embodiment of the present invention.

Please refer to FIG. 1, which is a three-dimensional view of a straddle-type steel section processing device of multiple saddles according to an embodiment of the present invention. In this embodiment, a straddle-type steel section processing device of multiple saddles is disclosed, which can be used for processing a steel section 1, whereas the steel section 1 is composed of a web 101 and a pair of flanges 102 that are disposed perpendicular to the web 101. In FIG. 1, the straddle-type steel section processing device of multiple saddles comprises: a machine unit 10, a holding unit 20, a Z-axis direction processing unit 30, a pair of Y-axis direction processing units 40, a Y-axis direction guiderail unit 50 and a Y-axis direction driving unit 60.

In addition, the machine unit 10 further comprises: a base 11, a pair of columns 12 that are fixedly mounted on the base 11, and a crossbeam 13 that is arranged at the top of the columns 12. Moreover, the base 11 is composed of: a first end 111, a second end 112 that is disposed opposite to the first end 111 in an X-axis direction, and a top surface 113 that is arranged extending from the first end 111 to the second end 112. The two columns 12 are disposed a distance from each other in a Y-axis direction that is perpendicular to the X-axis direction while each being arranged extending in a Z-axis direction that is perpendicular to the X-axis direction and the Y-axis direction simultaneously; and further the crossbeam 13 that is extending in the Y-axis direction is formed with an end surface 131, whereas the end surface 131 of the crossbeam 13 in the machine unit 10 is sloping from its front to the rear and formed with a front end 132 that is arranged at a position corresponding to the first end 111, and a rear end 133 that is arranged lower than the front end 132 and at a position corresponding to the second end 112, as shown in FIG. 3.

The holding unit 20 is disposed at the top surface 113 of the machine unit 10 to be used for holding and fixing the steel section 1 for processing.

Figure 2:
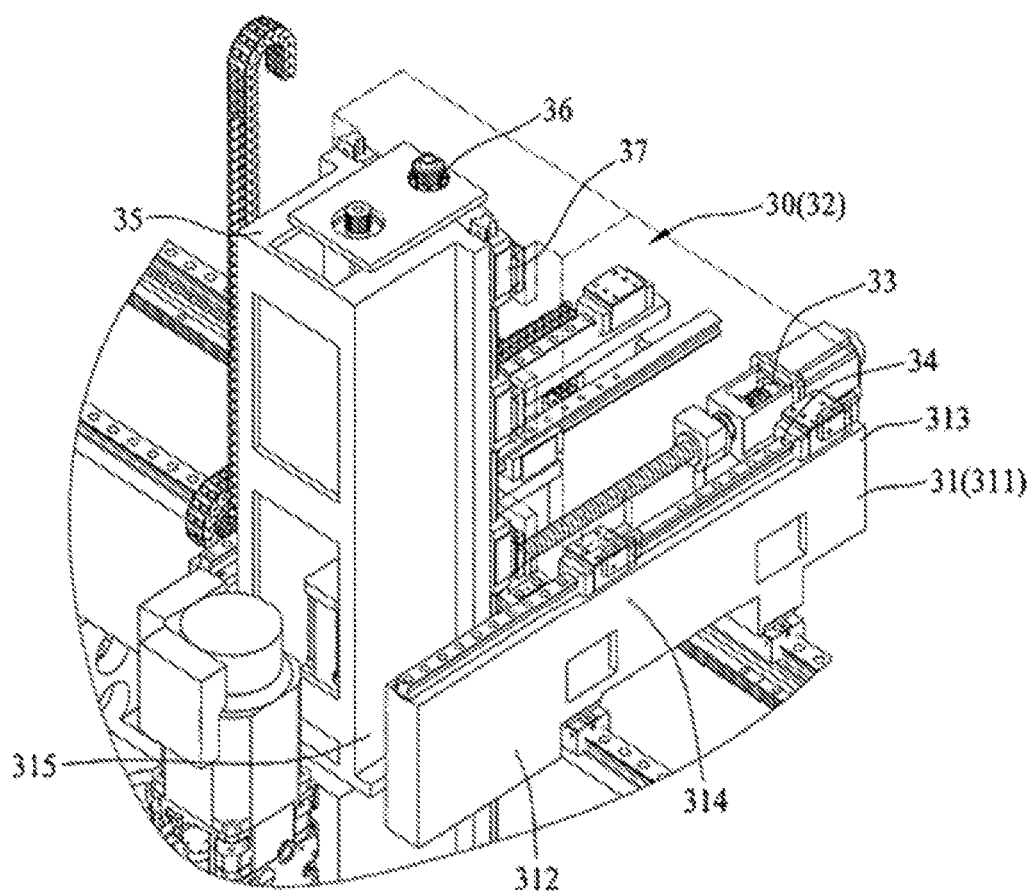
FIG. 2 is a partial three-dimensional diagram showing a Z-axis direction processing unit used in the straddle-type steel section processing device of multiple saddles of FIG. 1.
Figure 3:
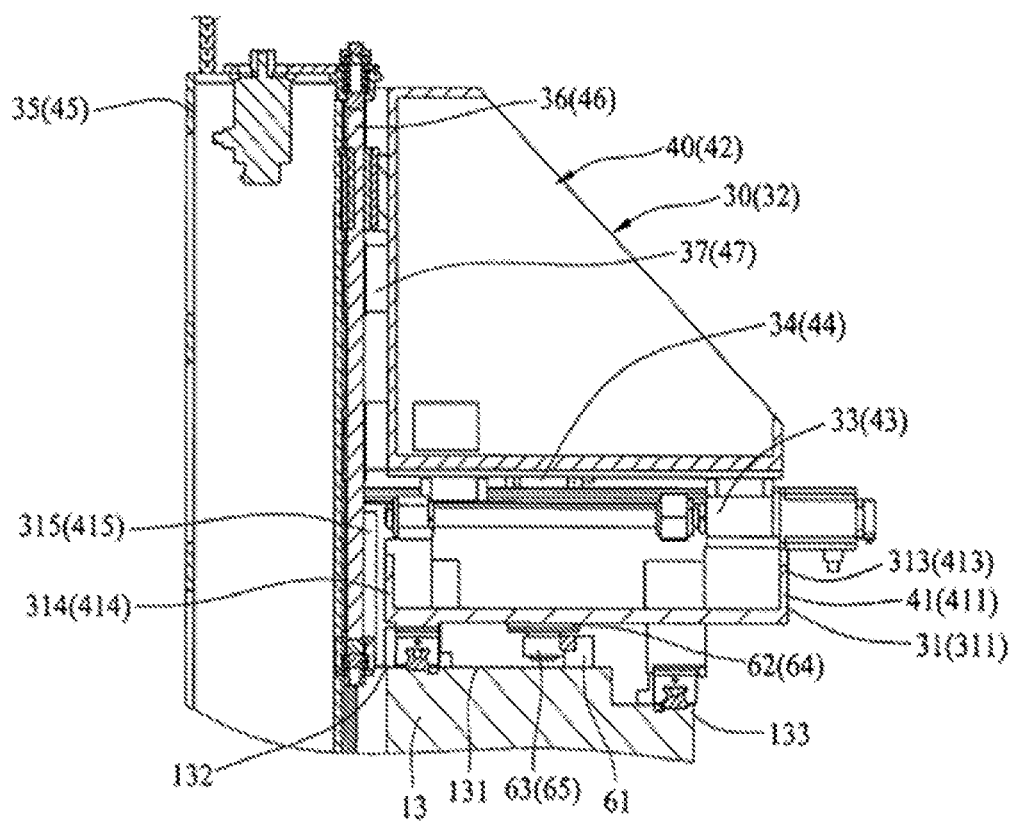
FIG. 3 is a partial sectional view of FIG. 1 showing the Z-axis direction processing unit and a Y-axis direction processing unit.

As shown in FIG. 2 and FIG. 3, the Z-axis direction processing unit 30 that is mounted on the crossbeam 13 for allowing the same to slide in the Y-axis direction further comprises: a main saddle 31 that is mounted on an end surface 131 of the crossbeam 13 for allowing the same to slide in the Y-axis direction, a main positioning seat 32 that is mounted on the main saddle 31 for allowing the same to slide in the X-axis direction, a first main driving member 33 that is disposed at a position between the main saddle 31 and the main positioning seat 32 for allowing the same to drive the main positioning seat 32 to slide relative to the main saddle 31 in the X-axis direction, a first guiderail set 34 that is disposed at a position between the main saddle 31 and the main positioning seat 32, a main sliding seat 35 that is mounted on the main positioning seat 32 for allowing the same to slide in the Z-axis direction, a second main driving member 36 that is disposed at a position between the main positioning seat 32 and the main sliding seat 35 for allowing the same to drive the main sliding seat 35 to slide relative to the main positioning seat 32 in the Z-axis direction, a second guiderail set 37 that is disposed at a position between the main positioning seat 32 and the main sliding seat 35, and a Z-axis processing head 38 that is mounted on the main sliding seat 35 for processing the webs 101. In an embodiment, both the first main driving member 33 and the second main driving member 36 can be a motor-driven lead screw which has a threaded insert fitted thereat to be used for screwing fixedly to the main positioning seat 32 or the main sliding seat 35. In addition, each of the first guiderail set 34 and the second guiderail set 37 can be an assembly of a pair of guiderails and a plurality of sliding blocks.

The main saddle 31 is further composed of: a main body 311 and a pair of main cantilever arms 312 that are extruding from the main body 311 in the X-axis direction and extending from the second end 112 toward the first end 111. In addition, the main body 311 has a pair of main rear ends 313 that are arranged at positions corresponding to the second end 112, and main cantilever arm 312 has a main front end 314 that is arranged at a position opposite to the corresponding main rear end 313 in the X-axis direction; and by the arrangement of the main body 311 and the main cantilever arms 312, a main accommodation space 315 is formed between the main body 311 and the main cantilever arms 312 for allowing the main sliding seat 35 to be receive therein, while the main cantilever arms 312 are extending outside the crossbeam 13 at a position above the top surface 113. In this embodiment, the length of each main cantilever arm 312 in the X-axis direction is not longer than half the length of the main body 311 in the X-axis direction.

Figure 4:
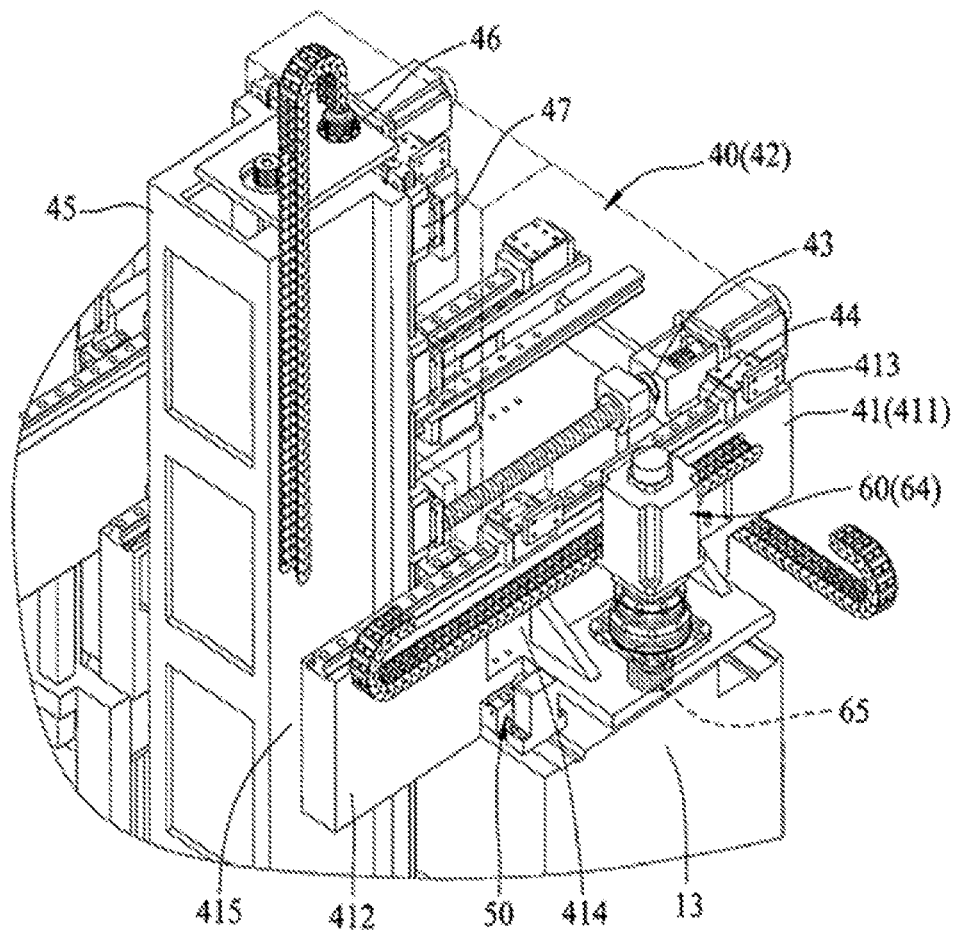
FIG. 4 is a partial three-dimensional diagram showing the Y-axis direction processing unit used in the straddle-type steel section processing device of multiple saddles of FIG. 1.
Figure 5:
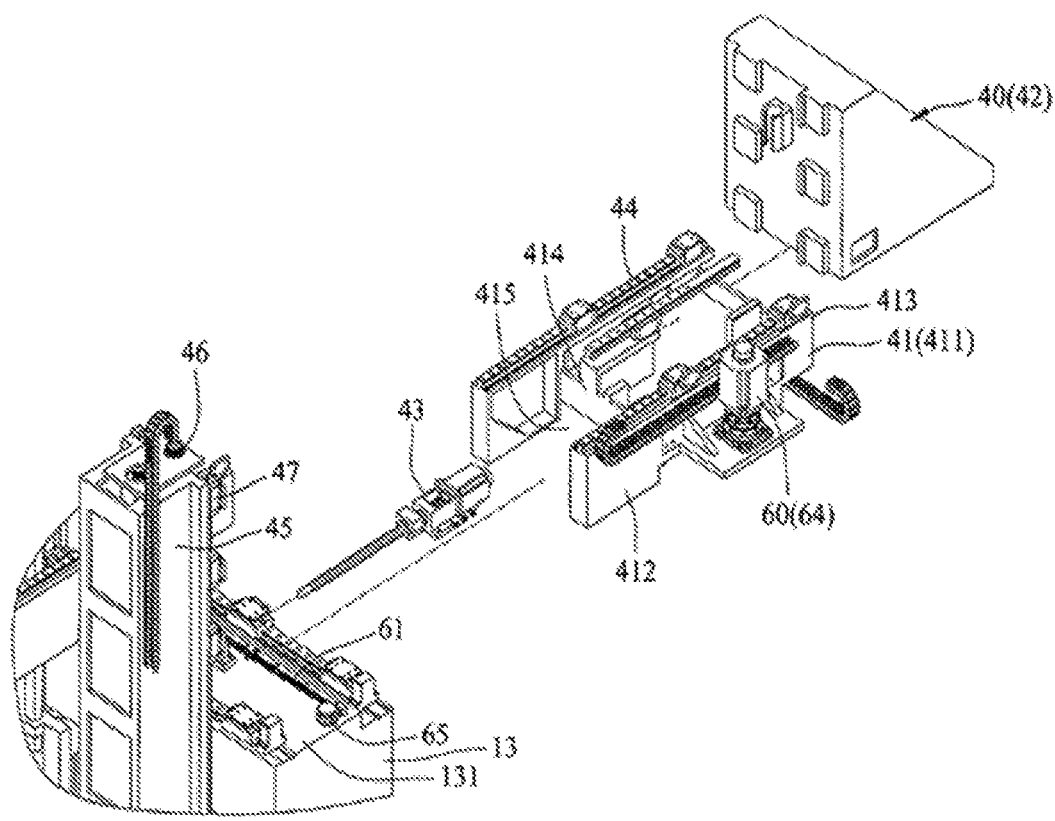
FIG. 5 is a partial exploded view of FIG. 1 showing the Y-axis direction processing unit.

As shown in FIG. 3, FIG. 4 and FIG. 5, the pair of Y-axis direction processing units 40 are arranged respectively at the two sides of the Z-axis direction processing unit 30 while allowing each to slide in the Y-axis direction as each Y-axis direction processing unit 40 is further being mounted on the crossbeam 13; and further each Y-axis direction processing unit 40 is composed of: a side saddle 41 that is mounted on the end surface 131 of the crossbeam 13 for allowing the same to slide in the Y-axis direction, a side positioning seat 42 that is mounted on the side saddle 41 for allowing the same to slide in the X-axis direction, a first side driving member 43 that is disposed at a position between the side saddle 41 and the side positioning seat 42 for allowing the same to drive the side positioning seat 42 to slide relative to the side saddle 41 in the X-axis direction, a first rail set 44 that is disposed at a position between the side saddle 41 and the side positioning seat 42, a side sliding seat 45 that is mounted on the side positioning seat 42 for allowing the same to slide in the Z-axis direction, a second side driving member 46 that is disposed at a position between the side positioning seat 42 and the side sliding seat 45 for allowing the same to drive the side sliding seat 45 to slide relative to the side positioning seat 42 in the Z-axis direction, a second rail set 47 that is disposed at a position between the side positioning seat 42 and the side sliding seat 45, and a Y-axis processing head 48 that is mounted on the side sliding seat 45 for processing the flange 102. In an embodiment, both the first side driving member 43 and the second side driving member 46 can be a motor-driven lead screw which has a threaded insert fitted thereat to be used for screwing fixedly to the side positioning seat 42 or the side sliding seat 45. In addition, each of the first rail set 44 and the second rail set 47 can be an assembly of a pair of guiderails and a plurality of sliding blocks.

Figure 6:
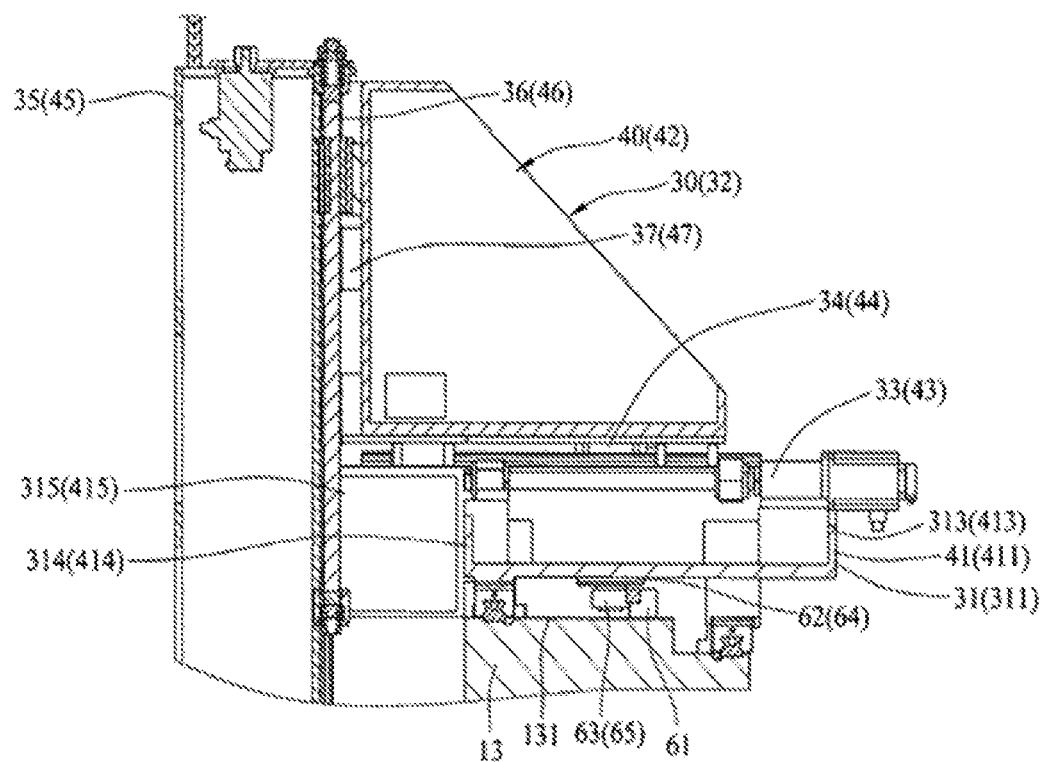
FIG. 6 is a schematic diagram showing the Z-axis direction processing unit and the Y-axis direction processing unit that are operating while a first main driving member is enabled to drive a main position seat to move in a Y-axis direction and a first side driving member is enabled to drive a side positioning seat to move also in the Y-axis direction.

The side saddle 41 of the Y-axis direction processing unit 40 is further composed of: a side body 411 and a pair of side cantilever arms 412 that are extruding from the side body 411 in the X-axis direction and extending from the second end 112 toward the first end 111. In addition, the side body 411 has a pair of side rear ends 413 that are arranged at positions corresponding to the second end 112, and each side cantilever arm 412 has a side front end 414 that is arranged at a position opposite to the corresponding side rear end 413 in the X-axis direction; and by the arrangement of the side body 411 and the side cantilever arms 412, a side accommodation space 415 is formed between the side body 411 and the side cantilever arms 412 for allowing the side sliding seat 45 to be receive therein, while the side cantilever arms 412 are extending outside the crossbeam 13 at a position above the top surface 113. In this embodiment, the length of each side cantilever arm 412 in the X-axis direction is not longer than half the length of the side body 411 in the X-axis direction. It is noted that the Z-axis direction processing unit 30 is structurally the same as those of the Y-axis direction processing units 40, and thus the cross sections of the Z-axis direction processing unit 30 and the Y-axis direction processing unit 40 that are shown in FIG. 3 and FIG. 6 are the same.

Furthermore, the Y-axis direction guiderail unit 50 is arranged extending in the Y-axis direction and is disposed at a position between the end surface 131 of the crossbeam 13 and the Y-axis direction processing units 40, whereas the Y-axis direction guiderail unit 50 can be composed of a pair of guiderails and a plurality of sliding blocks.

The Y-axis direction driving unit 60 is disposed at a position between the crossbeam 13, the Z-axis direction processing unit 30 and the two Y-axis direction processing units 40, by that the Y-axis direction driving unit 60 is able to drive the Z-axis direction processing unit 30 and the pair of Y-axis direction processing units 40 to slide respectively in the Y-axis direction. Moreover, the Y-axis direction driving unit 60 further comprises: a rack 61 that is disposed on the end surface 131; a first motor 62 that is disposed at the main saddle 31; a first gear 63 that is meshed to the rack 61 while being enable to be driven by the first motor 62; a pair of second motors 64 that are being arranged respectively at the corresponding side saddles 41; and a pair of second gears 65 that are meshed to the rack 61 while being enable to be driven by the corresponding second motors 64.

As shown in FIG. 1 to FIG. 5, in a fully assembled straddle-type steel section processing device of multiple saddles, the steel section 1 can be fixed to the base 11 by the used of the holding unit 20, and thus the Z-axis direction processing unit 30 can be enabled to machine the web 101 of the steel section 1 in the Z-axis direction while the Y-axis direction processing units 40 can be enabled to machine the flanges 102.

Operationally, as shown in FIG. 1 and FIG. 6, the activated first main driving member 33 of the Z-axis direction processing unit 30 will drive the assembly of the main positioning seat 32, the main sliding seat 35 and the Z-axis processing head 38 to move in the X-axis direction for enabling the main positioning seat 32 to move in and out the main accommodation space 315, by that the X-axis stroke of the Z-axis direction processing unit 30 can be defined. Similarly, the activated first side driving member 43 of the Y-axis direction processing unit 40 will drive the assembly of the side positioning seat 42, the side sliding seat 45 and the Y-axis processing head 48 to move in the X-axis direction for enabling the side positioning seat 42 to move in and out the side accommodation space 415, by that the X-axis stroke of the Y-axis direction processing unit 40 can be defined.

Figure 7:
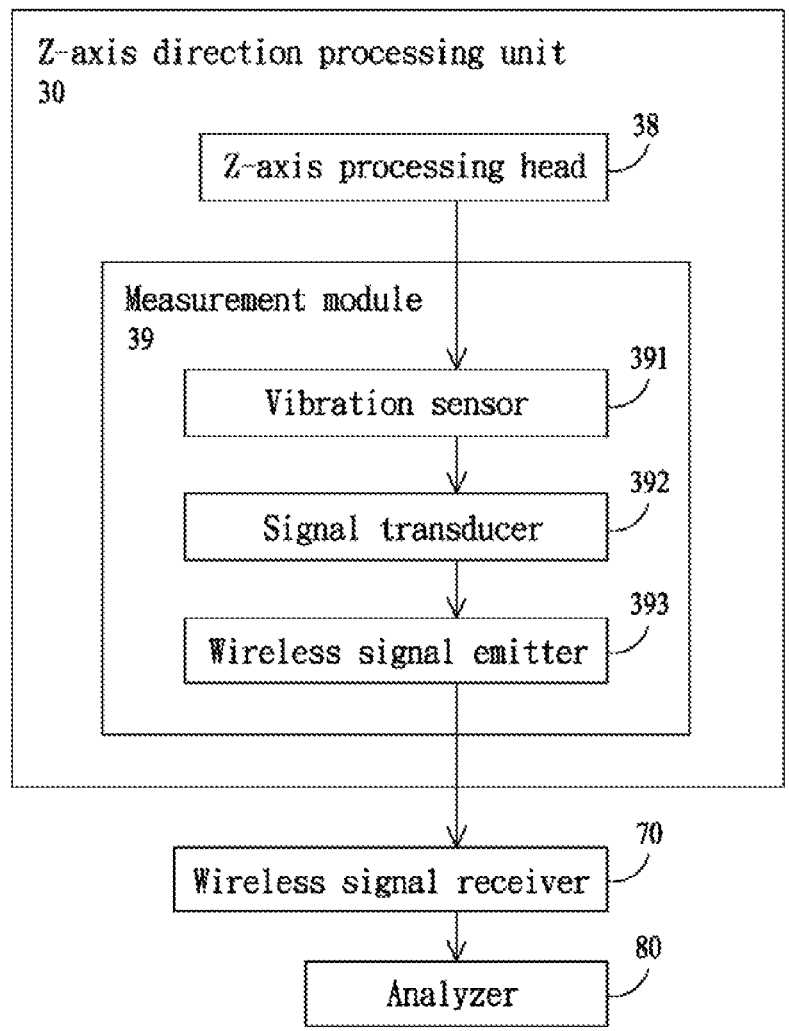
FIG. 7 is a block diagram showing the Z-axis direction processing unit of FIG. 1.

As shown in FIG. 7, the Z-axis direction processing unit 30 further comprises: a measurement module 39. The measurement module 39 is used for sensing a vibration signal emitted from the Z-axis processing head 38 that is installed in the Z-axis direction processing unit 30 and then converting the vibration signal into a digital vibration signal to be sent to an analyzer 80 and used in a calculation for obtaining a working status of the Z-axis processing head 38.

In an embodiment, the measurement module 39 further comprises: a vibration sensor 391, a signal transducer 392, and a wireless signal emitter 393, in which the vibration sensor 391 is provided for sensing the vibration signal emitted from the Z-axis processing head 38 of the Z-axis direction processing unit 30 and then transmitting the vibration signal to the signal transducer 392; the signal transducer 392 is provided for converting the vibration signal into a digital vibration signal and then transmitting the same to a wireless signal receiver 70 via the wireless signal emitter 393. After receiving the digital vibration signal, the wireless signal receiver 70 is enabled to send the digital vibration signal to an analyzer 80 to be used in a calculation for obtaining the working status of the Z-axis processing head 38.

Figure 8:
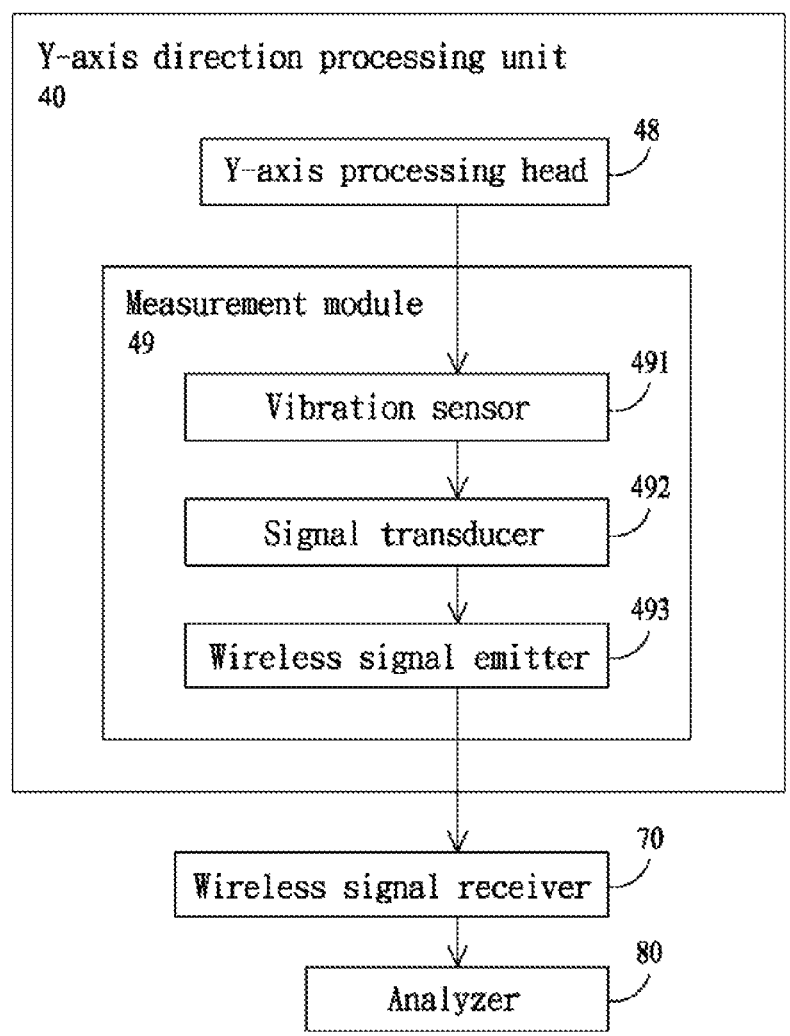
FIG. 8 is a block diagram showing the Y-axis direction processing unit of FIG. 1.

Similarly, as shown in FIG. 8, the Y-axis direction processing unit 40 also comprises: a measurement module 49. The measurement module 49 is used for sensing a vibration signal emitted from the Y-axis processing head 48 that is installed in the Y-axis direction processing unit 40 and then converting the vibration signal into a digital vibration signal to be sent to an analyzer 80 and used in a calculation for obtaining a working status of the Y-axis processing head 48.

In an embodiment, the measurement module 49 further comprises: a vibration sensor 491, a signal transducer 492, and a wireless signal emitter 493, in which the vibration sensor 491 is provided for sensing the vibration signal emitted from the Y-axis processing head 48 of the Y-axis direction processing unit 40 and then transmitting the vibration signal to the signal transducer 492; the signal transducer 492 is provided for converting the vibration signal into a digital vibration signal and then transmitting the same to a wireless signal receiver 70 via the wireless signal emitter 493. After receiving the digital vibration signal, the wireless signal receiver 70 is enabled to send the digital vibration signal to an analyzer 80 to be used in a calculation for obtaining the working status of the Y-axis processing head 48.

Conclusively, the straddle-type steel section processing device of multiple saddles of the present invention has the following advantages:

(1) By designing the main saddle 31 of the Z-axis direction processing unit 30 to slide on the end surface 131, the end surface 131 can provide a stable support to the main saddle 31 and similarly, by also designing the side saddle 41 of the Y-axis direction processing unit 40 to slide on the end surface 131, the end surface 131 can also provide a stable support to the side saddle 41. Thus, even considering that the Z-axis direction processing unit 30 and the Y-axis direction processing units 40 can be pretty heavy, the two processing units 30 and 40 as well as the two saddles 31, and 41 can be stably mounted on the crossbeam 13 for allowing them to operate even for a long period of time can still maintain a satisfactory process precision without causing offset errors, and consequently requiring less calibration.

(2) By designing the end surface 131 of the crossbeam 13 in the machine unit 10 is sloping from its front to the rear, the stable support to Z-axis direction processing unit 30 and the Y-axis direction processing units 40 that is provided by the crossbeam 13 can further be ensured.

(3) By designing the main cantilever arms 312 of the Z-axis direction processing unit 30 to extrude from the main body 311 in the X-axis direction while enabling the main cantilever arms 312 to extend outside the crossbeam 13 at a position above the top surface 113, and also by designing the side cantilever arms 412 of the Y-axis direction processing units 40 to extrude from the side body 411 in the X-axis direction while enabling the side cantilever arms 412 to also extend outside the crossbeam 13 at a position above the top surface 113, the processing strokes of the Z-axis direction processing unit 30 and the Y-axis direction processing units 40 can be prolonged and thus the processing efficiency is enhanced. In addition, by designing the length of each main cantilever arm 312 in the X-axis direction to be not longer than half the length of the main body 311 in the X-axis direction and similar designing the length of each side cantilever arm 412 in the X-axis direction to be not longer than half the length of the side body 411 in the X-axis direction, the buckling of the main cantilever arm 312 and the side cantilever arm 412 can be prevented without causing any adverse effect to the processing precision.

To sum up, the straddle-type steel section processing device of multiple saddles that is provide in the present invention is not only advantaged by its simple structure and ease to assemble, but also is the solution to all the technical problems that are troubling the currently available devices.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A steel section processing device of multiple saddles, comprising:
    a machine unit, including:
        a crossbeam, having an end surface; and
        a base, having a first end and a second end, the second end disposed opposite the first end in an X-axis direction;
    a Z-axis direction processing unit, mounted on the crossbeam to slide in a Y-axis direction;
    a pair of Y-axis direction processing units, arranged respectively at two sides of the Z-axis direction processing unit to slide in the Y-axis direction, each Y-axis direction processing unit comprising:
        a side saddle mounted on the end surface of the crossbeam to slide in the Y-axis direction,
        a side positioning seat mounted on the side saddle to slide in the X-axis direction, and
        a side sliding seat mounted on the side positioning seat to slide in the Z-axis direction; and
    a Y-axis direction guiderail unit, extending in the Y-axis direction disposed at a position between the end surface of the crossbeam and the Y-axis direction processing units.

2. The steel section processing device of claim 1,
    wherein the machine unit further comprises a pair of columns fixedly mounted on the base allowing the crossbeam with the end surface to be disposed on the tops of the column pair and extending in the Y-axis direction; and
    wherein the base further comprises a top surface extending from the first end to the second end; the two columns disposed a distance from each other in a Y-axis direction perpendicular to the X-axis direction and extending in a Z-axis direction perpendicular to the X-axis direction and the Y-axis direction simultaneously; and
    wherein the Z-axis direction processing unit has a Z-axis processing head disposed facing toward the top surface; and
    wherein each Y-axis direction processing unit further comprises:
        a first side driving member disposed at a position between the side saddle and the side positioning seat to drive the side positioning seat to slide relative to the side saddle in the X-axis direction,
        a second side driving member disposed at a position between the side positioning seat and the side sliding seat to drive the side sliding seat to slide relative to the side positioning seat in the Z-axis direction, and
        a Y-axis direction processing head mounted on the side sliding seat.

3. The steel section processing device of claim 2, wherein the side saddle of the Y-axis direction processing unit further comprises:
    a side body; and
    a pair of side cantilever arms extruding from the side body in the X-axis direction and extending from the second end toward the first end;
    wherein, the side body has a pair of side rear ends at positions corresponding to the second end, and each side cantilever arm has a side front end at a position opposite to the corresponding side rear end in the X-axis direction; and
    wherein a side accommodation space is formed between the side cantilever arms to receive the side sliding seat, and the side cantilever arms extend beyond the crossbeam at a position above the top surface.

4. The steel section processing device of claim 3, wherein the length of each side cantilever arm in the X-axis direction is not longer than half the length of the side body in the X-axis direction.

5. The steel section processing device of claim 4, wherein the end surface of the crossbeam in the machine unit is formed with a front end and a rear end lower than the front end.

6. The steel section processing device of claim 3, wherein the end surface of the crossbeam in the machine unit is formed with a front end and a rear end lower than the front end.

7. The steel section processing device of claim 2, wherein the Z-axis direction processing unit further comprises:
   a main saddle mounted on an end surface of the crossbeam to slide in the Y-axis direction,
   a main positioning seat mounted on the main saddle to slide in the X-axis direction,
   a first main driving member disposed at a position between the main saddle and the main positioning seat to drive the main positioning seat to slide relative to the main saddle in the X-axis direction,
   a main sliding seat mounted on the main positioning seat to slide in the Z-axis direction, and
   a second main driving member disposed at a position between the main positioning seat and the main sliding seat to drive the main sliding seat to slide relative to the main positioning seat in the Z-axis direction;
   wherein the Z-axis processing head is mounted on the main sliding seat.

8. The steel section processing device of claim 7, wherein the main saddle of the Z-axis direction processing unit further comprises:
   a main body; and
   a pair of main cantilever arms extruding from the main body in the X-axis direction and extending from the second end toward the first end;
   wherein, the main body has a pair of main rear ends arranged at positions corresponding to the second end, and main cantilever arm has a main front end arranged at a position opposite to the corresponding main rear end in the X-axis direction; and
   wherein, a main accommodation space is formed between the main body and the main cantilever arms to receive the main sliding seat, and the main cantilever arms extend beyond the crossbeam at a position above the top surface.

9. The steel section processing device of claim 8, wherein the length of each main cantilever arm in the X-axis direction is not longer than half the length of the main body in the X-axis direction.

10. The steel section processing device of claim 2, wherein the end surface of the crossbeam in the machine unit is formed with a front end and a rear end lower than the front end.

11. The steel section processing device of claim 2, wherein the Z-axis direction processing unit further comprises:
   a measurement module, sensing a vibration signal emitted from the Z-axis processing head installed in the Z-axis direction processing unit and converting the vibration signal into a digital vibration signal sent to an analyzer to determine a working status of the Z-axis processing head.

12. The steel section processing device of claim 11, wherein the measurement module further comprises:
   a vibration sensor, sensing the vibration signal emitted from the Z-axis processing head; and
   a signal transducer, receiving the vibration signal from the vibration sensor and converting the vibration signal into the digital vibration signal sent to a wireless signal emitter;
   wherein the wireless signal emitter, transmits the received digital vibration signal to a wireless signal receiver;
   wherein the wireless signal receiver transmits the received digital vibration signal to the analyzer; and
   wherein the analyzer determines the working status of the Z-axis processing head according to the received digital vibration signal.

13. The steel section processing device of claim 2, wherein the Y-axis direction processing unit further comprises:
   a measurement module, sensing a vibration signal emitted from the Y-axis processing head installed in the Y-axis direction processing unit and converting the vibration signal into a digital vibration signal sent to an analyzer and used to determine a working status of the Y-axis processing head.

14. The steel section processing device of claim 13, wherein the measurement module further comprises:
   a vibration sensor, for sensing the vibration signal emitted from the Y-axis processing head; and
   a signal transducer, receiving the vibration signal from the vibration sensor and converting the digital vibration signal into the digital vibration signal sent to a wireless signal emitter;
   wherein the wireless signal emitter transmits the received digital vibration signal to a wireless signal receiver;
   wherein the wireless signal receiver transmits the received digital vibration signal to the analyzer; and
   wherein the analyzer determines the working status of the Y-axis processing head according to the received digital vibration signal.

15. The steel section processing device of claim 1, further comprising:
   a holding unit, mounted on the top surface of the machine unit; and
   a Y-axis direction driving unit, disposed at a position between the Z-axis direction processing unit mounted on the crossbeam and the pair of Y-axis direction processing units to drive the Z-axis direction processing unit and the pair of Y-axis direction processing units to slide in the Y-axis direction.

16. The steel section processing device of claim 15, wherein the end surface of the crossbeam in the machine unit is formed with a front end and a rear end lower than the front end.

17. The steel section processing device of claim 15, wherein the Y-axis direction driving unit further comprises:
   a rack, disposed on the end surface;
   a first motor, disposed at the main saddle;
   a first gear, meshed to the rack and driven by the first motor;
   a pair of second motors, being arranged respectively at the corresponding side saddles; and
   a pair of second gears, meshed to the rack and driven by the corresponding second motors.

18. The steel section processing device of claim 1, wherein the end surface of the crossbeam in the machine unit is formed with a front end and a rear end lower than the front end.

19. The steel section processing device of claim 18, wherein the rear end includes a Y-directional slot in the crossbeam.

20. The steel section processing device of claim 18, wherein the first end of the base extends in the Z-axis direction, the first end and the second end of the base being at angles to one another; and wherein the second end of the base corresponds to the rear end of the end surface.

* * * * *